United States Patent
Podsadny et al.

(10) Patent No.: US 8,944,733 B2
(45) Date of Patent: Feb. 3, 2015

(54) DEVICE FOR HOLDING AN ADD-ON PART ON A SUPPORT PART, AND ARRANGEMENT WITH A DEVICE OF THIS TYPE AND WITH AN ADD-ON PART

(75) Inventors: Thomas Podsadny, Salzhausen (DE); René Spanier, Braunschweig (DE)

(73) Assignee: A. Raymond et Cie, Grenoble (FR)

(*) Notice: Subject to any disclaimer, the term of this patent is extended or adjusted under 35 U.S.C. 154(b) by 162 days.

(21) Appl. No.: 13/812,393

(22) PCT Filed: Jul. 19, 2011

(86) PCT No.: PCT/EP2011/062390
§ 371 (c)(1),
(2), (4) Date: Jan. 25, 2013

(87) PCT Pub. No.: WO2012/022568
PCT Pub. Date: Feb. 23, 2012

(65) Prior Publication Data
US 2013/0183089 A1    Jul. 18, 2013

(30) Foreign Application Priority Data

Aug. 20, 2010   (DE) .......................... 10 2010 035 012

(51) Int. Cl.
*F16B 19/00*    (2006.01)
(52) U.S. Cl.
USPC ............. 411/45; 24/295; 280/780.2; 411/508
(58) Field of Classification Search
USPC .................................... 411/508; 24/293–295
IPC .............................. B60R 13/0206; F16B 19/04
See application file for complete search history.

(56) References Cited

U.S. PATENT DOCUMENTS

| | | | | |
|---|---|---|---|---|
| 5,775,860 A | * | 7/1998 | Meyer | 411/46 |
| 7,086,125 B2 | * | 8/2006 | Slobodecki et al. | 24/295 |
| 7,900,953 B2 | * | 3/2011 | Slobodecki et al. | 280/728.2 |
| 8,038,167 B2 | * | 10/2011 | Slobodecki et al. | 280/728.2 |
| 8,220,827 B2 | * | 7/2012 | Schirm | 280/728.2 |
| 8,297,646 B2 | * | 10/2012 | Aoki | 280/728.2 |

(Continued)

FOREIGN PATENT DOCUMENTS

| | | |
|---|---|---|
| DE | 102007045296 B3 | 12/2008 |
| EP | 2090475 A1 | 8/2009 |

(Continued)

OTHER PUBLICATIONS

International Search Report and Written Opinion dated Nov. 31, 2011 in related International Application No. PCT/EP2011/062390.
International Search Report and Written Opinion dated Oct. 17, 2011 in related International Application No. PCT/EP2011/061876.

*Primary Examiner* — Gary Estremsky
(74) *Attorney, Agent, or Firm* — Faegre Baker Daniels LLP (57) ABSTRACT

A device for holding an add-on part on a support part in an assembly position and in a pull-out position. The device includes an insertion clip and a plug-in part. In an assembly position of the add-on part on the support part, the plug-in part is in engagement with the insertion clip whereas, after the add-on part has been spaced apart from the support part, the plug-in part can be disengaged from the insertion clip by displacement in the direction of a foot end of the insertion clip and can be removed together with the add-on part, which is connected to the plug-in part, from the insertion clip which remains in the support part.

20 Claims, 8 Drawing Sheets

(56) References Cited

U.S. PATENT DOCUMENTS

| | | |
|---|---|---|
| 2004/0052575 A1 | 3/2004 | Draggoo et al. |
| 2007/0137004 A1* | 6/2007 | Baekelandt .................. 24/289 |
| 2008/0028577 A1* | 2/2008 | Soman et al. .................. 24/293 |
| 2010/0295272 A1 | 11/2010 | Aoki |

FOREIGN PATENT DOCUMENTS

| | | |
|---|---|---|
| GB | 2364973 A | 2/2002 |
| WO | WO2009/063715 A1 | 5/2009 |
| WO | WO2012/022545 A1 | 2/2012 |

* cited by examiner

DEVICE FOR HOLDING AN ADD-ON PART ON A SUPPORT PART, AND ARRANGEMENT WITH A DEVICE OF THIS TYPE AND WITH AN ADD-ON PART

This application is a U.S. National Phase Patent Application based on International Application No. PCT/EP2011/062390 filed Jul. 19, 2011, which claims priority to German Patent Application No. 10 2010 035 012.5 filed Aug. 20, 2010, the entire disclosures of which are hereby explicitly incorporated by reference herein.

BACKGROUND OF THE INVENTION

1. Field of the Invention

The present invention relates to a device for holding an add-on part on a support part. The invention also concerns an arrangement with such a device and with an add-on part.

2. Description of the Related Art

One known device of this kind is disclosed in EP 2 090 475 A1. The prior device for holding an add-on part on a support part in a mounted position and in a protracted position comprises an insertion clip having snap tongues that are configured at a foot end and are provided to engage with a support part. Also present is a plug-in part, which is equipped with a fixing arrangement for engaging with an add-on part and is adapted to slide in the insertion clip in order to hold the add-on part in a mounted position approximated to the support part and in a protracted position spaced apart from the support part.

SUMMARY OF THE INVENTION

The present invention provides a device for holding an add-on part on a support part and an arrangement with such a device and with an add-on part, by means of which the add-on part, proceeding from the protracted position, can be detached relatively easily from a support part and can, together the insertion clip, be reconnected to the support part in the mounted position.

Through the provision of a bracing arrangement configured according to the invention, the add-on part is stably held in the mounted position on the support part by means of the insertion clip, whereas, proceeding from the protracted position, the add-on part can be removed from the support part once a resistance has been overcome and the plug-in part has been released and disengaged from the insertion clip. The insertion clip is therefore accessible again and can be detached from the support part and re-used to mount another add-on part on the support part.

In one form thereof, the present invention provides a device for holding an add-on part on a support part in a mounted position and in a protracted position in which the add-on part is farther away from the support part than in the mounted position, including a U-shaped insertion clip which when used as intended is disposed in a support part opening provided in the support part, and including a plug-in part which when arranged as intended is displaceably connected to the insertion clip and to the add-on part, characterized in that in the mounted position of the add-on part, the plug-in part is disposed in a bracing arrangement configured on the insertion clip and is secured against being removed from the bracing arrangement in a direction away from the support part; in that in the protracted position of the add-on part, the bracing arrangement presents a resistance to the plug-in part sliding of out of engagement with the bracing arrangement in the direction of the support part; and in that after the resistance is overcome, the plug-in part is free of engagement with the insertion clip and can be detached therefrom.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

Figure 1:
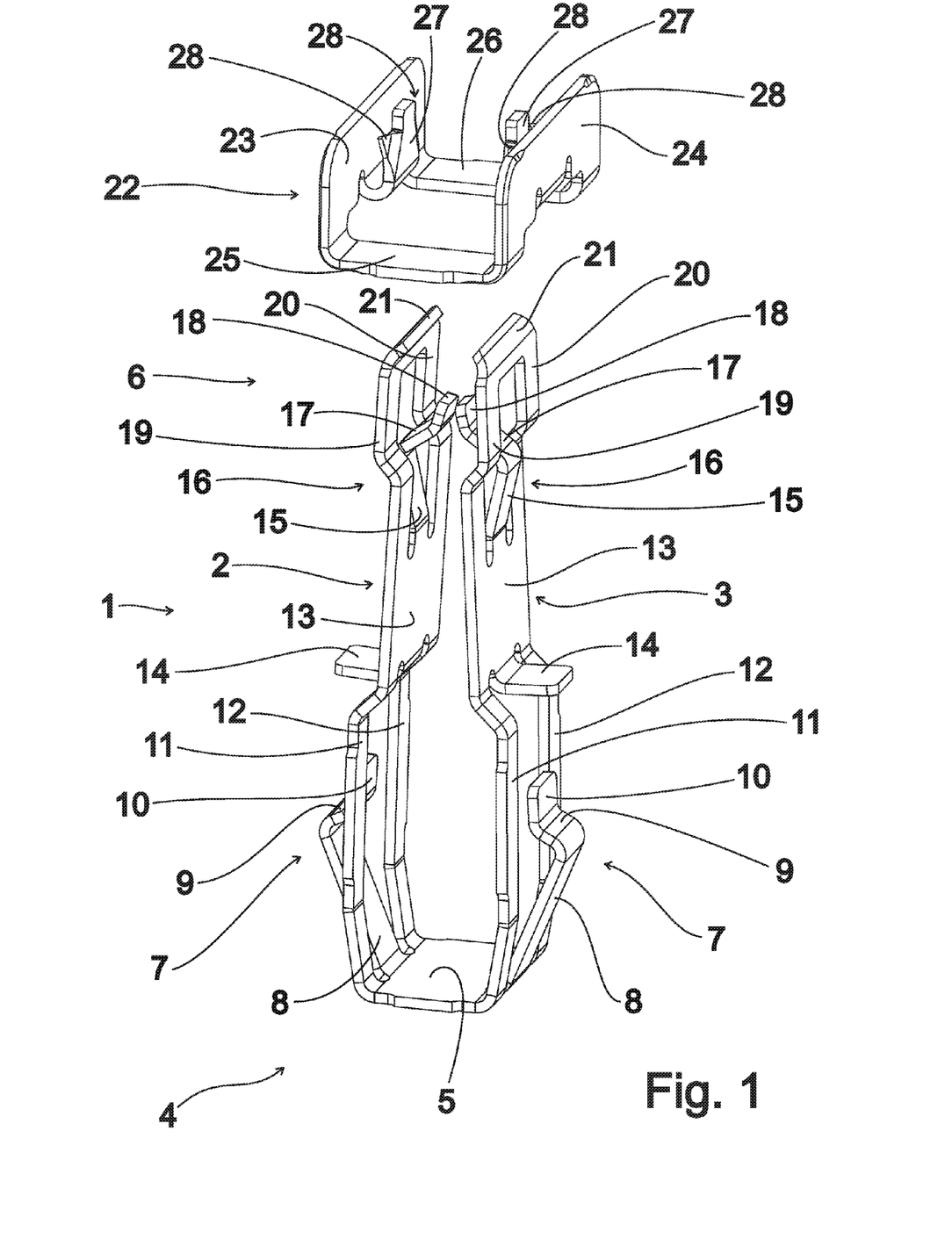
FIG. 1 is a perspective view of an exemplary embodiment of a device according to the invention with an insertion clip and with a plug-in part, which are out of engagement.

FIG. 1 is a perspective view of an exemplary embodiment of a device according to the invention, comprising an elongated insertion clip 1 made preferably as a stamped and bent part from sheet metal. The insertion clip 1, which is configured as U-shaped, has a first clip arm 2 and a second clip arm 3, which are connected to each other at a foot end 4 via a foot plate 5. In the relaxed arrangement shown in FIG. 1, the clip arms 2, 3 are oriented extending obliquely toward each other from the foot end 4 toward a head end 6 disposed oppositely from the foot end 4.

Each clip arm 2, 3 is provided with a resilient snap tongue 7, which is connected to the foot plate 5 by a straight tie portion 8 that extends obliquely outwardly away from the respective arm 2, 3. At the end of the tie portion 8 remote from the foot plate 5, each snap tongue 7 is configured with an abutment portion 9 oriented approximately at right angles to the tie portion 8 and extending toward the other snap tongue 7. Attached to the abutment portion 9 in turn, at its opposite end from the tie portion 8, is a catch portion 10, which in the relaxed arrangement of the snap tongues 7 shown in FIG. 1 is oriented approximately at right angles to the foot plate 5.

On both sides of each snap tongue 7, each clip arm 2, 3 is configured with a first foot-end edge web 11 and with a second foot-end edge web 12, which extend toward the end head 6 from the region of their connection to the foot plate 5, project past the snap tongues 7 in the longitudinal direction of the insertion clip 1 and terminate in a full-surface middle portion 13. The foot-end edge webs 11, 12 are bent obliquely toward each other in the region of their connection to the middle portion 13.

In the region of the connection of the foot-end edge webs 11, 12 to the middle portion 13, each clip arm 2, 3 has a bearing tongue 14 oriented approximately parallel to the foot plate 5 and utwardly away from the other clip arm 2, 3.

Formed on each middle portion 13, on the side remote from the bearing tongue 14, via a straight tie portion 15 that protrudes obliquely outward beyond said middle portion 13, is a bracing tongue 16 comprising, at the end of the tie portion 15 remote from the middle portion 13, a bearing portion 17 and an inner portion 18. Between two head-end edge webs 19, 20 disposed one on each side of each bracing tongue 16, the bearing portion 17 reaches from the outer side of the particular clip arm 2, 3 to the inner side that faces the other clip arm 2, 3. The ends of the head-end edge webs 19, 20 remote from the middle portion 13 are connected to each other in each case via a respective curved head tongue 21, each pointing toward the other via a bend.

The head-end edge webs 19, 20 each have in the middle region a bend step that causes the portions of the head-end edge webs 19, 20 adjacent the respective head tongue 21 to be spaced farther apart than the portions of the head-end edge webs 19, 20 adjacent the middle portion 13.

In the exemplary embodiment according to FIG. 1, the device according to the invention is further equipped with a U-shaped plug-in part 22, also preferably made as a stamped and bent part from sheet metal, and having two substantially parallel lateral arms 23, 24 and, disposed edgewise to said lateral arms 23, 24, two connecting webs 25, 26 that are spaced apart from each other and connect the lateral arms 23, 24 to each other. Formed on each lateral arm 23, 24 is a fixing tongue 27 that extends from the side proximate the respective connecting web 25, 26 in a semicircular curve away from said connecting web 25, 26 and is disposed on a respective one of the facing inner sides of the lateral arms 23, 24. Formed on the lateral edge sides of the fixing tongues 27 are edge claws 28 that are angled toward the lateral arm 23, 24 on which the particular fixing tongue 27 is formed.

Figure 2:
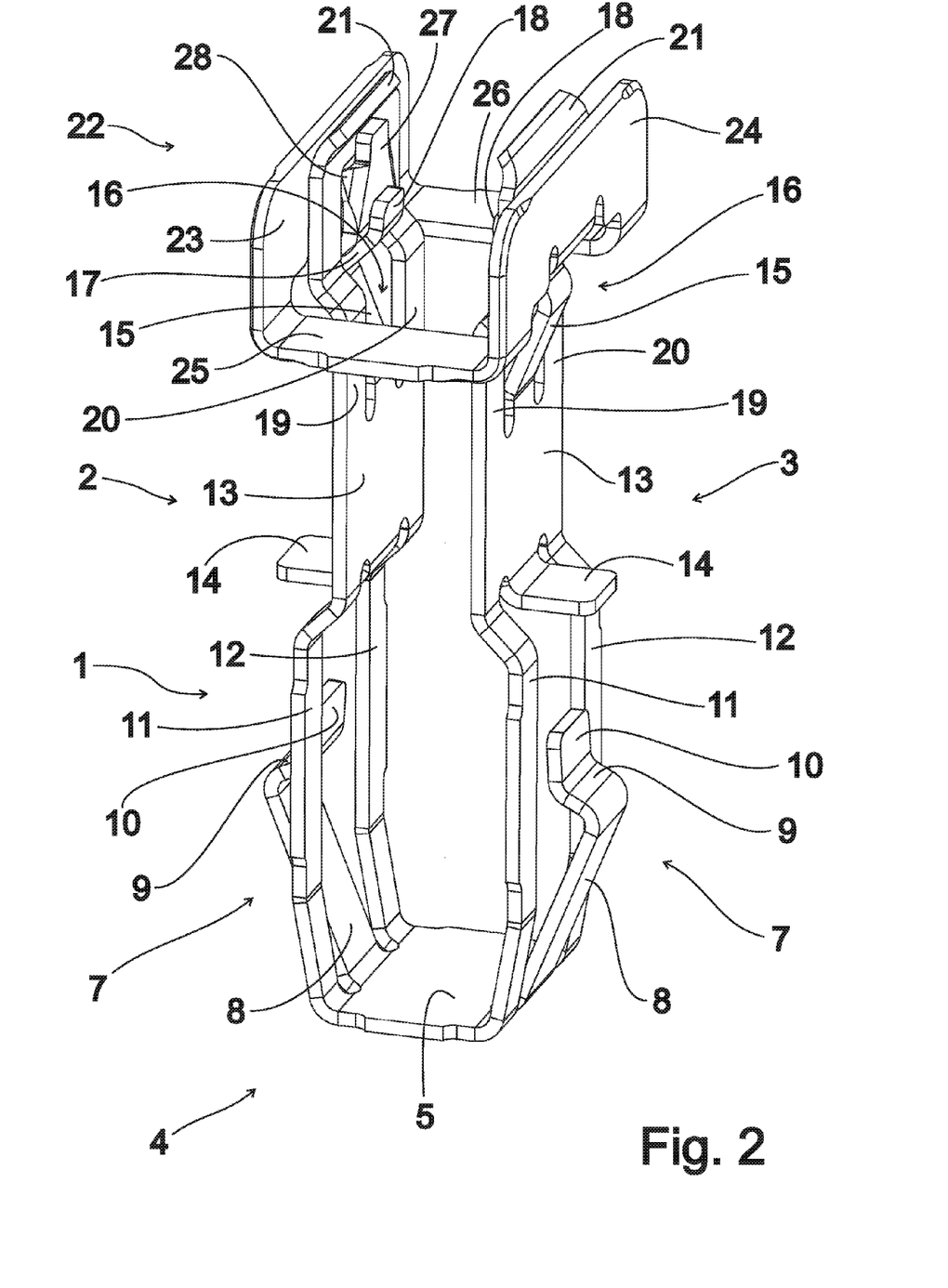
FIG. 2 is a perspective view of the exemplary embodiment according to FIG. 1 with the insertion clip and the plug-in part in engagement with each other.

FIG. 2 is a perspective view of the exemplary embodiment according to FIG. 1 with a plug-in part 22 mated onto the insertion clip 1. In the arrangement shown in FIG. 2, after the clip arms 2, 3 have spread apart, the fixing tongues 27 insert themselves in approximately parallel mutual alignment through the space formed between the head-end edge webs 19, 20 and rest by their roundly curved portions proximate the connecting webs 25, 26 on the bearing portions 17 of the bracing tongues 16, which together with the edge webs 19, 20 form a bracing arrangement. The head tongues 21 are disposed between the lateral arms 23, 24 of the plug-in part 22 and the free ends of the fixing tongues 27 and are secured by the edge claws 28. The head-end edge webs 19, 20 of the insertion clip 1 pass between the connecting webs 25, 26. Due to the engagement of the plug-in part 22 with the clip arms 2, 3 of the insertion clip 1, the clip arms 2, 3 are now in a biased, substantially parallel alignment. In this as-delivered state depicted in FIG. 2, the device according to the invention can be deployed as intended.

Figure 3:
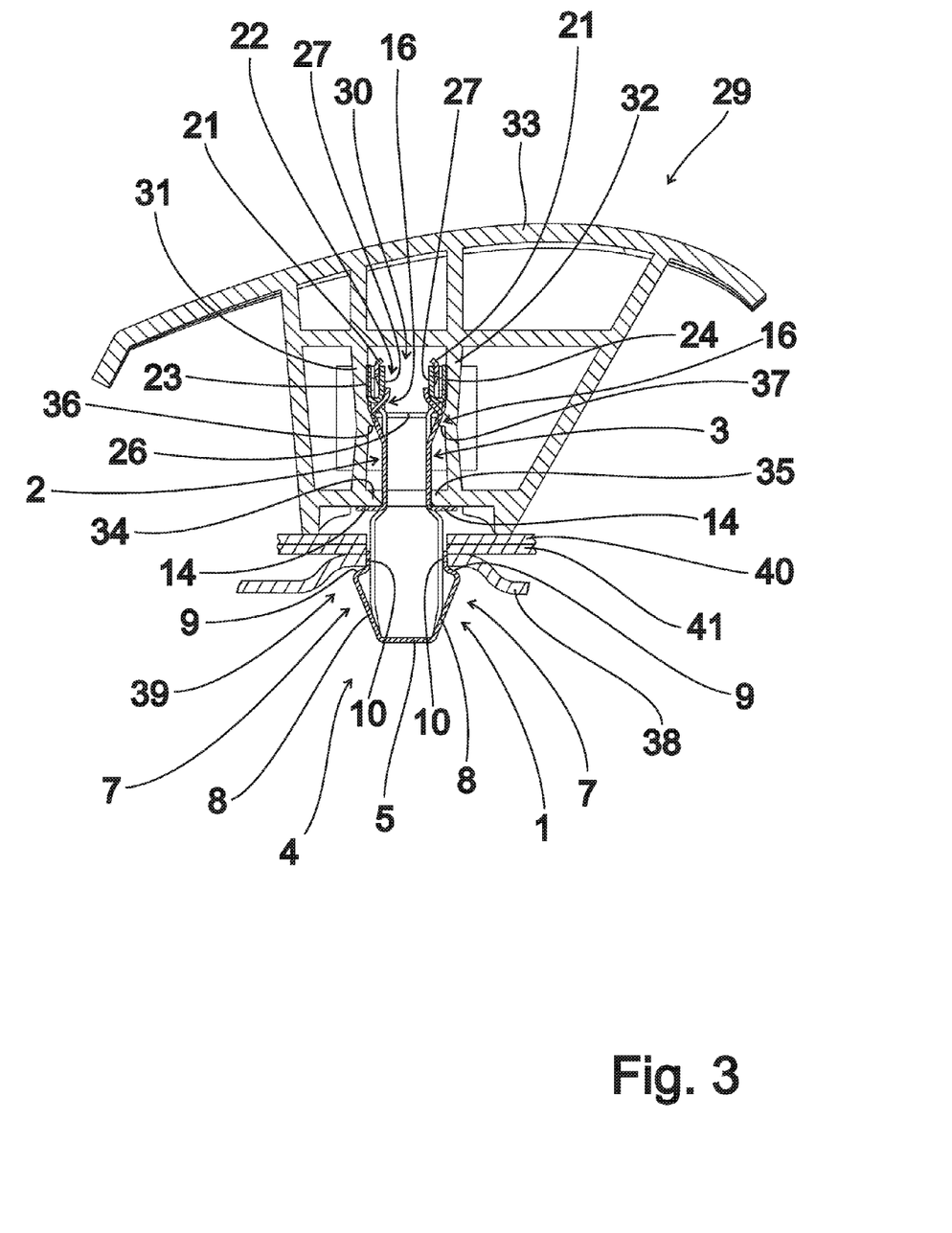
FIG. 3 is a sectional view of an arrangement according to the invention with a device according to the invention according to the exemplary embodiment of FIG. 1 and with an add-on part held in a mounted position on a support part by means of the inventive device.

FIG. 3 is a sectional view of an arrangement according to the invention with an add-on part 29 and with a device according to the invention according to the exemplary embodiment of FIG. 1. The add-on part 29 comprises a receiving compartment 30 bounded laterally by two mutually facing outer walls 31, 32. Formed on the outer walls 31, 32, in their end regions remote from a top side 33 of the add-on part 29, are bottom webs 34, 35 that point toward each other and through which the clip arms 2, 3 pass. Configured on the outer walls 31, 32 at a distance from the floor webs 34, 35 are intermediate webs 36, 37 that project into the receiving compartment 30. In the mounted position according to FIG. 3, the intermediate webs 36, 37 engage the insertion part 22 from behind in the region of connection of the lateral arms 23, 24 and the connecting webs 25, 26, whereas the floor webs 34, 35 each rest on the side of a respective bearing tongue 14 that faces toward the head end 6 the insertion clip 1.

In this relative positioning, to assume the mounted position shown in FIG. 3 the insertion clip 1 is introduced, foot end 4 first, through a support part opening 39 formed in a support part 38, until the abutment portions 9 of the snap arms 7 engage behind the rim of the support part opening 39 and the catch portions 10 contact the inner side of the carrier part opening 39. It can further be understood from the representation of FIG. 3 that disposed between the add-on part 29 and the support part 38 are a flexible fabric layer 40 and a flexurally rigid backing layer 41, which are elements of an air bag device, for example, and on which the add-on part 29 rests.

Figure 4:
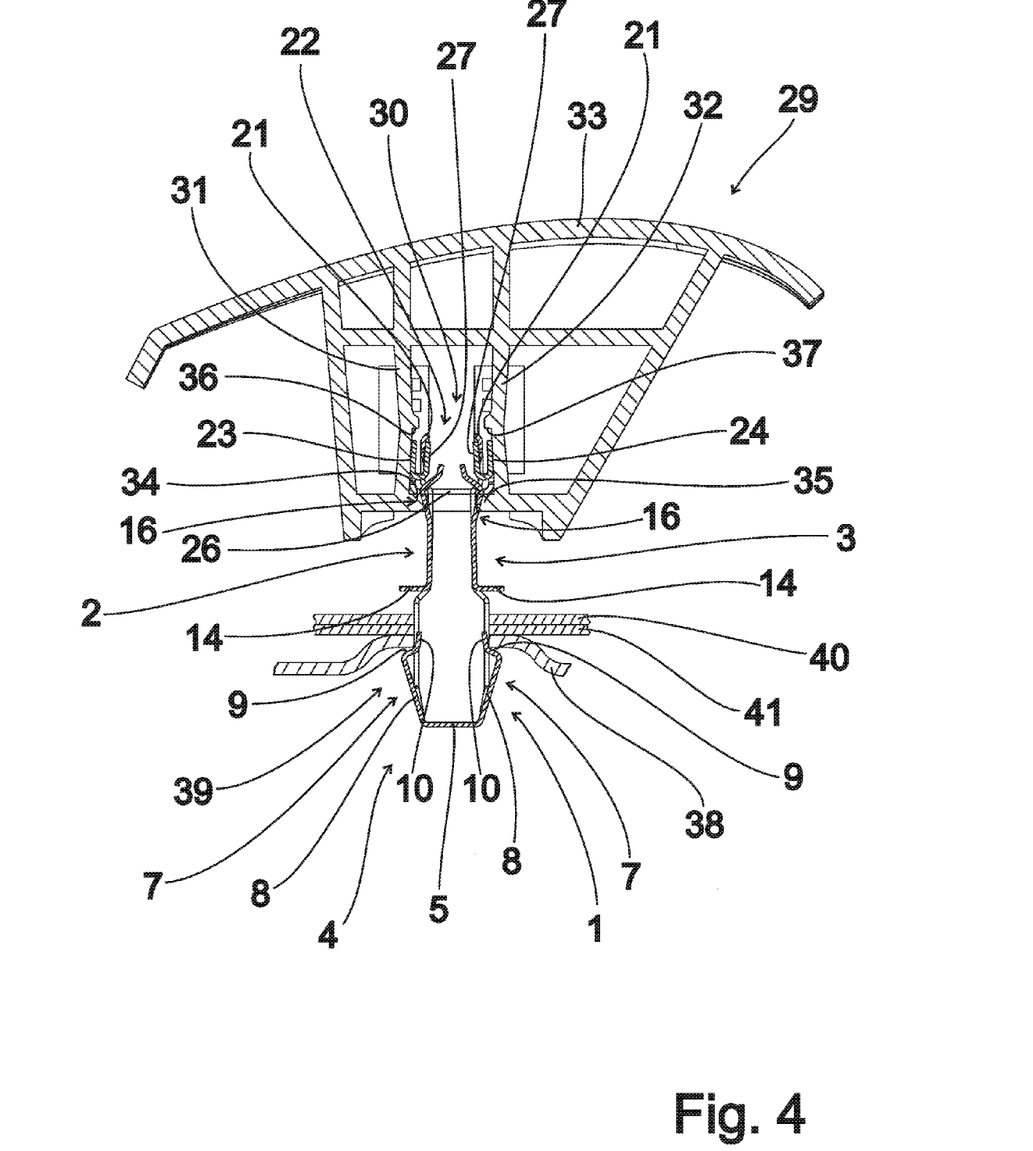
FIG. 4 is a sectional view of the arrangement according to FIG. 3 with the support part in a protracted position.

FIG. 4 is a sectional view of the arrangement according to the invention with a device according to the invention comprising an insertion clip 1 and a plug-in part 22 and with the add-on part 29 in a protracted position of the add-on part 29 in which it is farther away from the support part 38 than it is in the mounted position of FIG. 3, said protracted position being the typical position assumed after the inflation of an air bag of the air bag assembly due to the exertion of a force in the longitudinal direction of the inventive device by the lifting off of the add-on part 29 from the support part 38. Due to the force exerted in the longitudinal direction, the intermediate webs 36, 37 spread away from the plug-in part 22 and are thereby released from their engagement with the plug-in part 22, with the result that the intermediate webs 36, 37 are now opposite the free top sides of the lateral arms 23, 24, and the bottom webs 34, 35 engage the plug-in part 22 from behind in the region of connection of the lateral arms 23, 24 and the connecting webs 25, 26.

Figure 5:
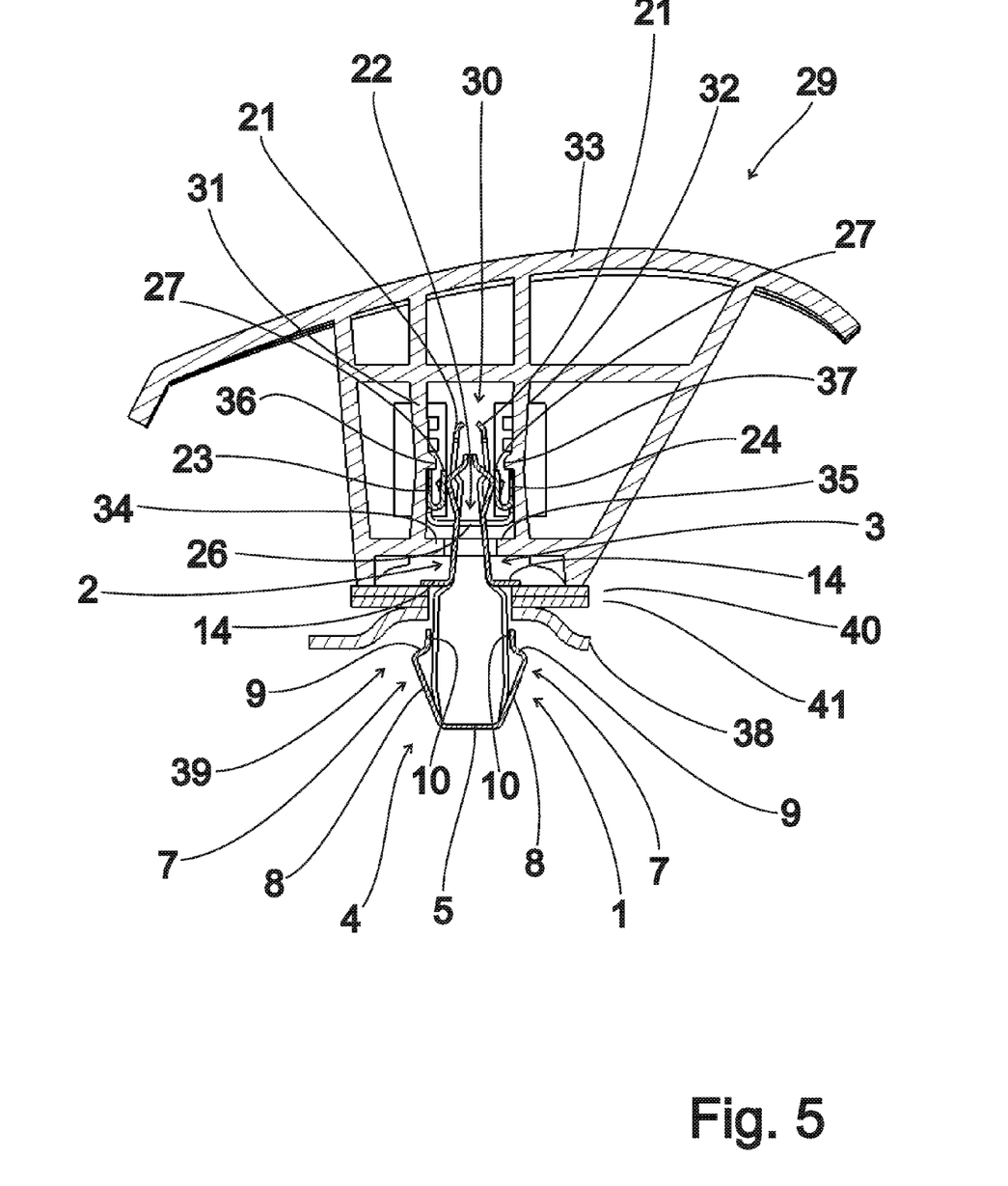
FIG. 5 is a sectional view of the arrangement according to FIG. 3 during a demounting operation with an add-on part moved closer to the support part from the protracted position of FIG. 4.

FIG. 5 is a sectional view of the arrangement according to FIG. 4 after the add-on part 29 has been moved toward the support part 38 until the bearing tongues 14 are resting on the fabric layer 40 and the intermediate webs 36, 37, by resting on the free top sides of the lateral arms 23, 24, have taken the plug-in part 22 out of engagement with the insertion clip 1 after a resistance has been overcome, causing the fixing tongues 27 to slide out of the head end 6 of the insertion clip 1. The two head tongues 21 of the clip arms 2, 3 are now out of engagement with the fixing tongues 27 of the plug-in part 22, and the two bracing tongues 16 have rebounded and, for their part, now bear outwardly against the inner sides of the fixing tongues 27 and, via the connecting portions 15, exert a force on the clip arms 2, 3 that is directed such that the clip arms 2, 3 extend toward each other. The head tongues 21 are thereby disposed within an imaginary prolongation of the two fixing tongues 27 that extends away from the foot portion 4. This ensures that as the demounting continues, the two head tongues 21 cannot go back to a position on the fixing tongues 27 or the edge claws 28, thus ensuring that the add-on part 29 will be detached even if the inherent relaxation of the clip arms 2, 3 is relatively minimal. The inwardly directed bends of the head tongues 21 ensure that they will not become caught on the support part 38 or the intermediate webs 36, 37 as the add-on part 29 draws nearer.

Figure 6:
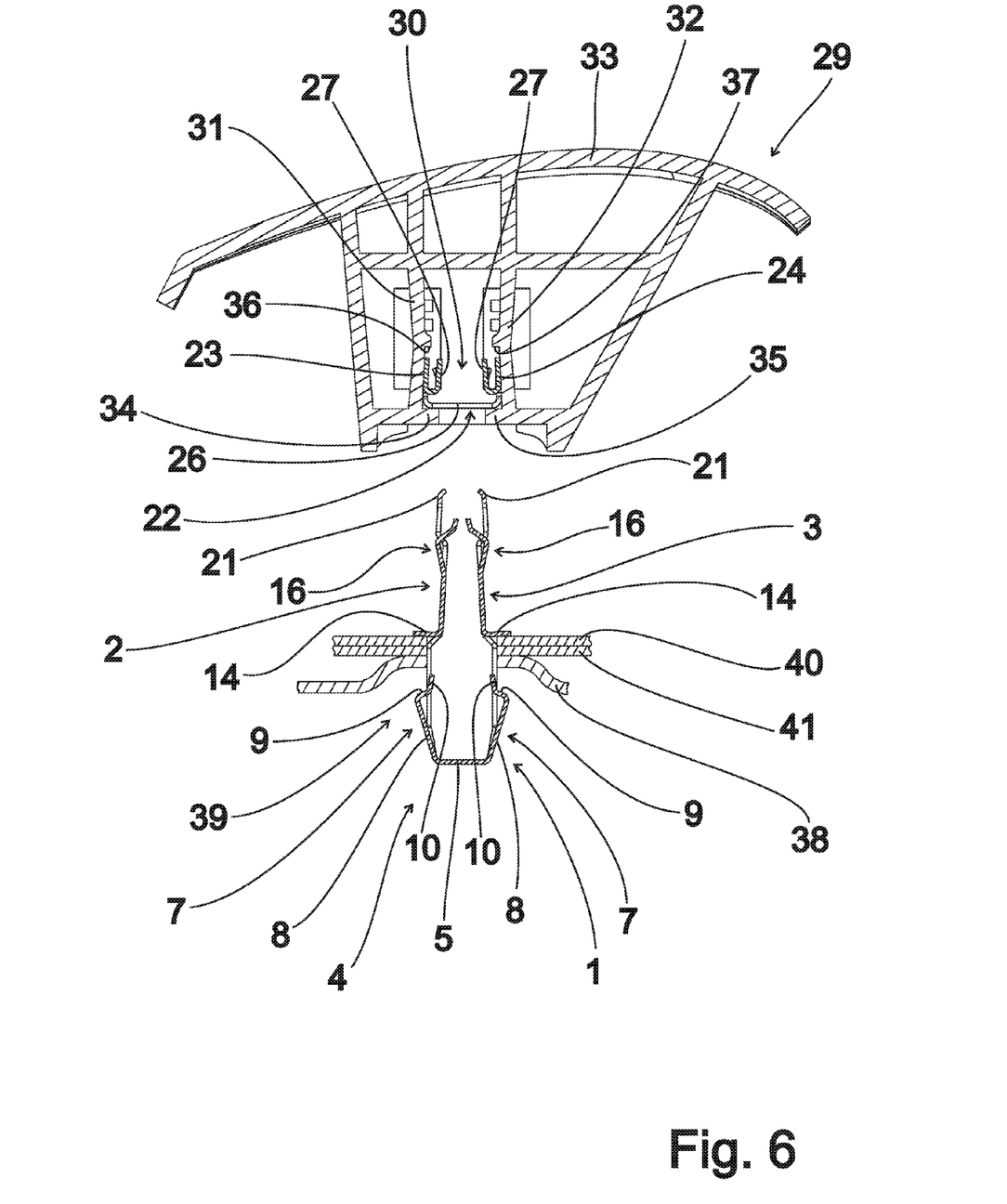
FIG. 6 is a sectional view of the end of the demounting operation, with an add-on part removed from a support part.

FIG. 6 is a sectional view of the arrangement composed of the insertion clip 1, the plug-in part 22, the add-on part 29 and the support part 38 according to FIG. 5 after the add-on part 29 has been lifted off the support part 38. Due to the lack of engagement between the insertion clip 1 and the plug-in part 22 in the arrangement of FIG. 5, the add-on part 29 can be lifted off the support part 38 with essentially no resistance, the insertion clip 1 remaining in the support part 38 and the plug-in part 22 remaining in the add-on part 29. The now exposed insertion clip 1 can then be extracted from the support part 38, while the plug-in part 22 can be removed from the receiving compartment 30. The insertion clip 1 and the plug-in part 22 can then be restored to the as-delivered state depicted in FIG. 2 and used again.

Figure 7:
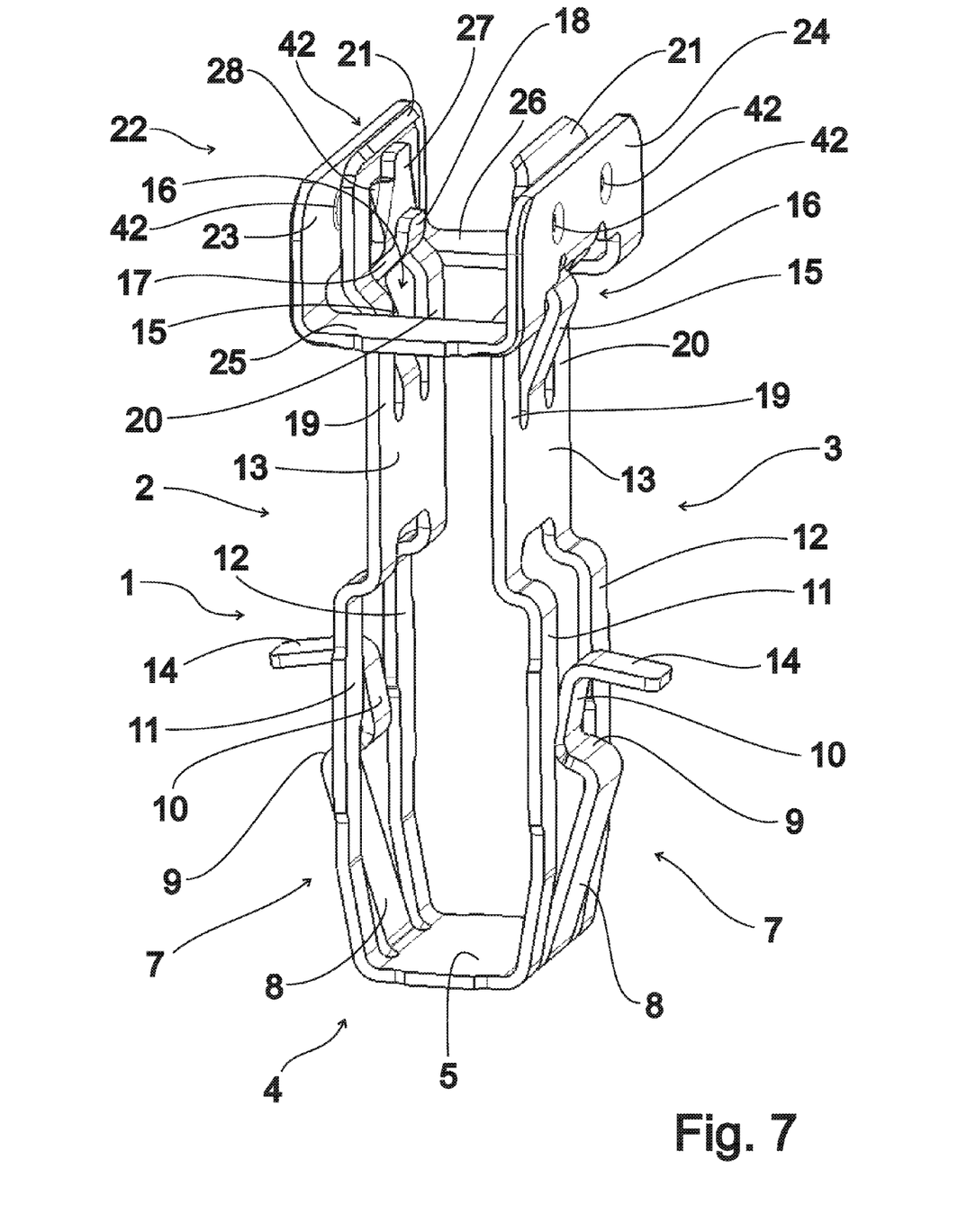
FIG. 7 is a perspective view of a further exemplary embodiment of a device according to the invention with an insertion clip and with a plug-in part, which are in engagement with each other.

FIG. 7 is a perspective view of another exemplary embodiment of a device according to the invention with an insertion clip 1 and with a plug-in part 22 in the as-delivered state shown in FIG. 2. To avoid repetition, like elements of the exemplary embodiment according to FIG. 1 and the exemplary embodiment according to FIG. 7 have been given the same reference numerals and will not be described in more detail below. In the exemplary embodiment according to FIG. 7, the bearing tongues 14 are each joined to the end of the catch portion 10 of the respective snap tongue 7 remote from the respective abutment portion 9 and are oriented approximately parallel to that abutment portion 9. In addition, in the plug-in part 22, inwardly protruding stampings 42 have been sunk into the lateral arms 23, 24 on both sides of each fixing tongue 27 to prevent the clip arms 2, 3 of the insertion clip 1 from sliding by their head tongues 21 into the clearance that must be present for reasons of production tolerances between the edge claws 28 and the lateral arms 23, 24 of the plug-in part 22 and becoming stuck there.

Figure 8:
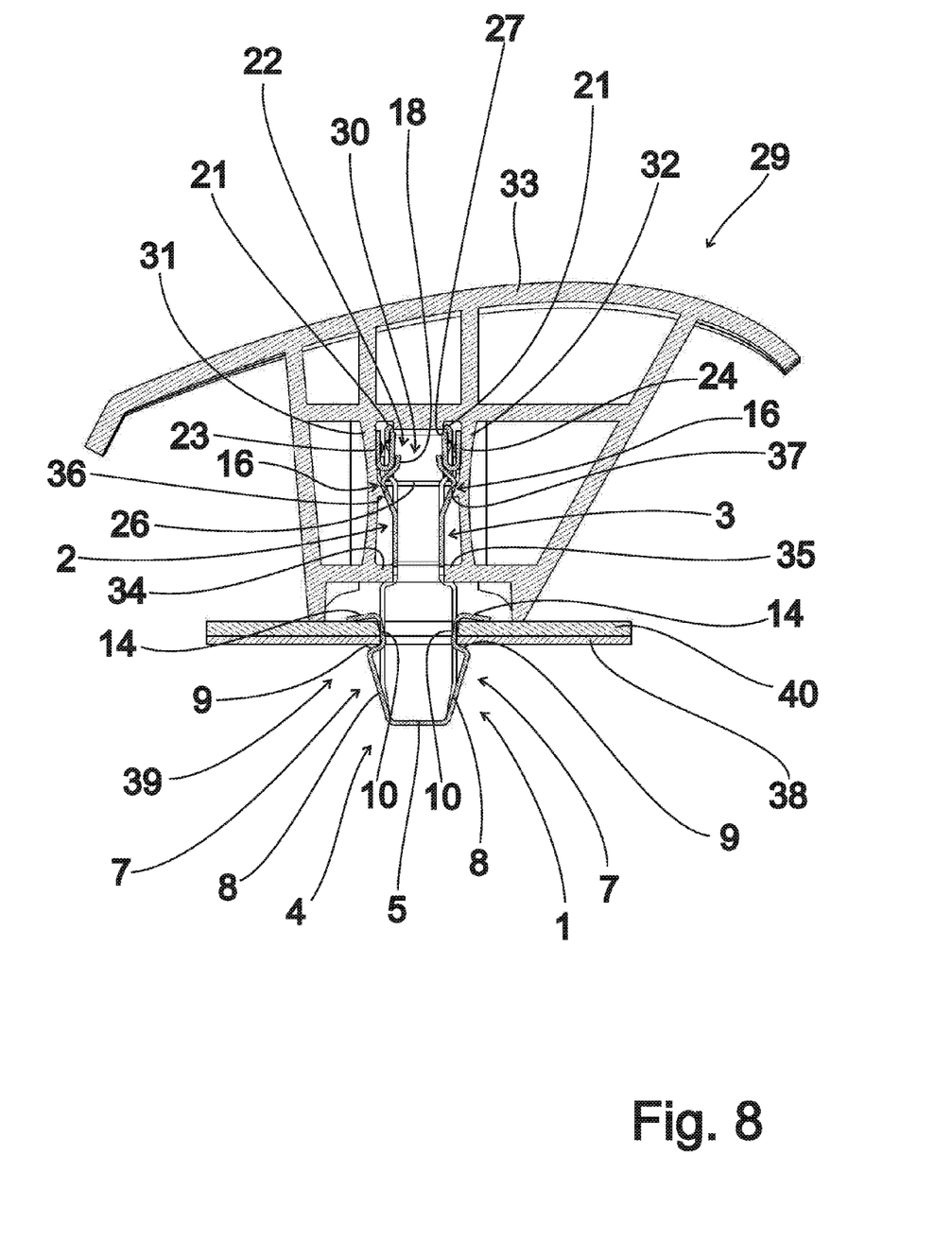
FIG. 8 is a sectional view of an arrangement according to the invention with a device according to the invention according to the exemplary embodiment of FIG. 7 and with an add-on part held in a mounted position on a support part.

FIG. 8 is a sectional view of the exemplary embodiment according to FIG. 7 in an arrangement corresponding to FIG. 3, with an add-on part 29 in a mounted position wherein it is tightly approximated to a support part 38. It can be seen from FIG. 8 that the abutment portions 9 of the snap tongues 7 engage behind a support part opening 39 formed in the support part 38, whereas the bearing tongues 14 rest on a fabric layer 40, particularly an air bag assembly, which is laid on the support part 38 and on which the add-on part 29 also rests. After an explosion of the air bag device, lifting the fabric layer 40 off the support part 38, the arrangement according to FIG. 8 is shifted into an arrangement corresponding to FIG. 4 in the exemplary embodiment according to FIG. 1, and is demounted as explained in connection with FIG. 5 and FIG. 6.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimd is:

1. A device for holding an add-on part on a support part in a mounted position and in a protracted position, in which the add-on part is f ether away from the support part than in the mounted position, said device comprising:

a U-shaped insertion clip insertable within a support part opening provided in said support part; and a plug-in part displaceable connected to said insertion clip and to said add-on part;

wherein, in the mounted position of the add-on part, said plug-in part is connected to said insertion clip in a bracing arrangement and is secured gainst being removed from said bracing arrangement in a direction away from the support part;

and wherein, in the protracted position of said add-on part, said bracing arrangement presents a resistance to said plug-in part sliding out of engagement with said bracing arrangement in a direction of the support part and, upon overcoming the resistance, said plug-in part is free of engagement with said insertion clip;

said insertion clip including a foot end, and two clip arms connected to each other via a foot plate at said foot end;

a snap tongue configured on each said clip arm, each snap tongue including an abutment portion for engaging a support part; and a bearing tongue configured on one of each clip arm and each snap tongue, each said bearing tongue disposed opposite said abutment portion in a direction of said bracing arrangement.

2. The device of claim 1, wherein said plug-in part includes two mutually parallel lateral arms connected to each other via two connecting webs delimiting a through-opening between said connecting webs.

3. The device of claim 1, wherein said clip arms each include a head end with two head end edge webs defining a space therebetween, and said plug-in part further comprises two parallel lateral arms each having a fixing tongue, said fixing tongues received in said spaces between said head end edge webs.

4. A device for holding an add-on part on a support part in a mounted position and in a protracted position in which the add-on part is farther away from the support part than in the mounted position, said device comprising:

a U-shaped insertion clip insertable within a support part opening provided in said support part: and a plug-in part displaceably connected to said insertion clip and to said add-on part:

wherein the mounted position of the add-on part, said plug-in part is connected to said insertion clip in a bracing arrangement and is secured against being removed from said bracing arrangement in a direction away from the support part;

and wherein, in the protracted position of said add-on part, said bracing arrangement presents a resistance to said plug-in part sliding out of engagement with said bracing arrangement in a direction of the support part and, upon overcoming the resistance, said plug-in part is free of engagement with said insertion clip:

said insertion clip including a foot end, and two clip arms connected to each other via a foot plate at said foot end:

said plug-in part including two mutually parallel lateral arms connected to each other via two connecting webs delimiting a through-opening between said connecting webs: and wherein:

said bracing arrangement comprises two bracing tongues configured each on a respective clip arm of said insertion clip, said bracing tongues disposed in clearances and positioned pointing toward each other and toward free ends of said clip arms;

said plug-in part comprises fixing tongues configured on said lateral arms of said plug-in part; and wherein, in the mounted position, said clip arms are trapped between said bracing tongues and said fixing tongues by said connecting webs, rest on bearing portions of said bracing tongues, and. are dimensioned to slide out of said clearances.

5. The device of claim 4, wherein said insertion clip includes a head end and a foot end and said clip arms in a relaxed state extend obliquely toward each other at said head end.

6. The device of claim 4, further comprising a snap tongue configured. on each said clip arm, each snap tongue including an abutment portion for engaging a support part.

7. The device of claim 4, wherein said clip arms each include a. head end with two head end edge webs defining a space therebetween, and said plug-in part further comprises two parallel lateral arms each having fixing tongue, said fixing tongues received, in said spaces between said head end edge webs.

8. A device for holding an add-on part on a support part in a mounted position and in a protracted position in which the add-on part is farther away from the support part than in the mounted position, said device comprising:
  a U-shaped insertion clip insertable within a support part opening provided in said support part; and
  a plug-in part displaceably connected to said insertion clip and to said add-on part;
  wherein the mounted position of the add-on part, said plug-in part is connected to said insertion clip in a. bracing arrangement and is secured against being removed, from said bracing arrangement in a direction away from the support part;
  and wherein, in the protracted position of said. add-on part, said bracing arrangement presents a resistance to said plug-in part sliding out of engagement with said bracing arrangement in a direction of the support part and, upon overcoming the resistance, said plug-in part is free of engagement with said insertion clip;
  wherein said insertion clip farther comprises two clip arms each having a head end with two head end edge webs defining a space therebetween, and said plug-in part further comprises two parallel lateral arms each having a fixing tongue, said fixing tongues received. in said. spaces between said head end edge webs.

9. The device of claim 8, wherein said insertion clip includes a foot end, and two clip arms connected to each other via a foot plate at said foot end.

10. The device of claim 9, wherein said plug-in part includes two mutually parallel lateral arms connected to each other via two connecting webs delimiting a through-opening between said connecting webs.

11. The device of claim 9, further comprising a snap tongue configured on each said clip arm, each snap tongue including an abutment portion for engaging a support part.

12. The device of claim 11, further comprising a bearing tongue configured on one of each clip arm and each snap tongue, each said bearing tongue disposed opposite said abutment portion in a direction of said bracing arrangement.

13. The device of claim 8, wherein said insertion clip includes a head end and a foot end and said clip arms in a relaxed state extend obliquely toward each other at said head end.

14. A device for holding an ad-on part on a support part in a mounted position and in a protracted position in which said add-on part is farther away from the support part than in the mounted position, said device comprising:
  a U-shaped insertion clip insertable within a support part opening provided in said support part; and
  a plug-in part displaceably connected to said insertion clip and to said add-on part;
  wherein, in the mounted position of the add-on part, said plug-in part is connected to said insertion clip in a bracing arrangement and is secured against being removed from said bracing arrangement in a direction away from the support part;
  and wherein, in the protracted position of said add-on part, said bracing arrangement presents a resistance to said plug-in part sliding out of engagement with said bracing arrangement in a direction of the support part and, upon overcoming the resistance, said plug-in part is free of engagement with said insertion clip; and
  said add-on part including two intermediate webs which, in the mounted position are disposed on a side of said plug-in part facing toward a foot end of said insertion clip and, in the protracted position, are disposed on a side of said plug-in part facing away from said foot end of said insertion clip.

15. The device of claim 14, wherein said insertion clip includes a foot end, and two clip arms connected to each other via a foot plate at said foot end.

16. The device of claim 15, wherein said plug-in part includes two mutually parallel lateral arms connected to each other via two connecting webs delimiting a through-opening between said connecting webs.

17. The device of claim 15, further comprising a snap tongue configured on each said clip arm, each snap tongue including an abutment portion for engaging a support part.

18. The device of claim 17, further comprising a bearing tongue configured on one of each clip arm and each snap tongue, each said bearing tongue disposed opposite said abutment portion in a direction of said bracing arrangement.

19. The device of claim 18, wherein said insertion clip further comprises two clip arms each having a head end with two head end edge webs defining a space therebetween, and said plug-in part further comprises two parallel lateral arms each having a fixing tongue, said fixing tongues received in said spaces between said head end edge webs.

20. The device of claim 18, wherein said insertion clip includes a head end and a foot end and said clip arms in a relaxed state extend obliquely toward each other at said head end.

* * * * *

UNITED STATES PATENT AND TRADEMARK OFFICE
CERTIFICATE OF CORRECTION

PATENT NO. : 8,944,733 B2  
APPLICATION NO. : 13/812393  
DATED : February 3, 2015  
INVENTOR(S) : Thomas Podsadny et al.

Page 1 of 1

It is certified that error appears in the above-identified patent and that said Letters Patent is hereby corrected as shown below:

In the Claims

In Claim 1, Column 5, Line 66, please change [f ether] to [farther]

In Claim 1, Column 6, Line 7, please change [gainst] to [against]

In Claim 7, Column 7, Line 15, please delete the "." after the words "include a"

In Claim 8, Column 7, Line 29, please delete the "." after the words "clip in a"

In Claim 8, Column 7, Line 30, please delete the "," after the word "removed"

In Claim 8, Column 7, Line 32, please delete the "." after the word "said"

In Claim 8, Column 7, Line 38, please change [farther] to [further]

In Claim 8, Column 7, Line 42, please delete the "." after the words "received" and "said"

Signed and Sealed this
Twenty-eighth Day of April, 2015

Michelle K. Lee
*Director of the United States Patent and Trademark Office*